United States Patent [19]

Shatila

[11] 3,975,551

[45] Aug. 17, 1976

[54] MICROBIALLY-STABLE POTATO PRODUCTS AND PROCESS

[75] Inventor: Mounir A. Shatila, Blackfoot, Idaho

[73] Assignee: American Potato Company, San Francisco, Calif.

[22] Filed: Feb. 7, 1975

[21] Appl. No.: 548,114

Related U.S. Application Data

[62] Division of Ser. No. 159,571, July 2, 1971, Pat. No. 3,895,122.

[52] U.S. Cl. ............................... 426/637; 426/269
[51] Int. Cl.² .......................................... A23L 1/216
[58] Field of Search ............ 426/269, 316, 319, 637

[56] References Cited
UNITED STATES PATENTS

| | | | |
|---|---|---|---|
| 2,506,793 | 5/1950 | Kalmar | 426/262 |
| 2,893,878 | 7/1959 | Simon | 426/267 |
| 3,063,849 | 11/1962 | Nelson | 426/267 |

OTHER PUBLICATIONS

Talburt et al., Potato Processing, Avi. Pub. Co., Westport Conn., 1967, pp. 509–511.

*Primary Examiner*—Jeanette M. Hunter
*Attorney, Agent, or Firm*—Townsend and Townsend

[57] ABSTRACT

Gelatinized potato pieces containing sufficient generally uniformly dispersed sulfur dioxide to enable the pieces to be protected from microbial contamination even when stored for prolonged periods at ambient temperature. An article of manufacture including ambient temperature, stable, sulfur dioxide-containing gelatinized potato pieces surrounded by a substantially oxygen free environment in a microbe/oxygen impermeable container. The process of treating gelatinized potato pieces to make them microbially stable at ambient temperature during prolonged time periods by dispersing sulfur dioxide through the pieces and protecting them from subsequent contamination. Storage of the pieces in a substantially oxygen free or inert gas environment also enhances flavor stability in the stored products. Products include partially cooked french fry strips which need only to be heated or fried to make ready for consumption, as well as large pieces such as whole potatoes which can be used in such food products as potato salad with no further treatment or heated to make a baked potato.

6 Claims, No Drawings

MICROBIALLY-STABLE POTATO PRODUCTS AND PROCESS

This is a division of application Ser. No. 159,571, filed July 2, 1971, now U.S. Pat. No. 3,895,122.

BACKGROUND OF THE INVENTION

1. Field of the Invention

This invention relates to preservation of at least partially cooked potato pieces by treatment with sulfur dioxide and packaging to exclude microbial contamination and oxygen and to the related process.

2. Description of the Prior Art

Sulfur dioxide gas and sulfur dioxide-containing salts have been incorporated in processes for the preservation of fresh fruits, vegetables, meats and the like, having low and intermediate moisture contents, see U.S. Pat. No. 1,061,460, issued May 13, 1913. In the dehydration of most vegetables, sulfur dioxide is used, (usually in the form of solutions of a sodium salt) to prevent oxidation and enzymatic discoloration during processing and to protect the dried products from nonenzymatic browning. In the drying of fruits, sulfur dioxide treatment is known to bleach the dark pigments resulting from enzymatic browning and subsequently protect the dried fruit from nonenzymatic browning.

Sulfur dioxide heretofore has not been used commercially to microbially stabilize partially cooked foods containing high moisture. The state of the art prior to this invention is summarized in the text *Disinfection, Sterilization and Preservation* Carl A. Lawrence and Seymour S. Block, Lea & Sebiger Publisher, 1968, which has an entire chapter devoted to GASEOUS STERILIZATION. The only reference to sulfur dioxide in the chapter is a statement at page 669 that it was used in the 19th Century as a means of fumigating sick rooms. Sulfur dioxide, however, is discussed at pages 639–640 in more detail in Chapter 39, entitled FOOD PRESERVATIVES. There it is stated that sulfur dioxide is used to "treat" fruits and vegetables before dehydration. Low concentrations of sulfur dioxide are also used to delay the decay of fresh grapes and inhibit undesirable bacteria in wine making without interfering with yeast action.

Other prior art teachings involve subjecting various fresh fruits and vegetables to sulfur dioxide under pressure in excess of 5 psig in a closed chamber to enhance storage characteristics. Pre-peeled potatoes have heretofore been treated with minor concentrations of sulfite salt solutions to prolong their storage life under refrigeration. However, when significant concentrations of sulfur dioxide or its salts are used on raw prepared potato pieces, substantial potato cell destruction occurs, resulting in considerable fluid loss from the cells. As a consequence, commercially available potato pieces are either canned, refrigerated, frozen or dehydrated.

The prior art does not disclose or suggest means for producing high moisture potato products in the class of convenience foods which can be stored at ambient temperatures and which can be simply and quickly utilized to make a variety of potato dishes.

Frozen french fried potatoes are by far the biggest volume frozen food item sold in the United States. Over 2 billion pounds were sold in 1959. Such commercially available parfried products must be kept frozen throughout the distribution channels up to final heating prior to consumption. The inherent high cost is accepted since no other means has heretofore been developed for keeping the product microbially stable without such refrigeration. Prepeeled french fries are likewise sold in tremendous quantities. Such products must be held under refrigeration and even then have a limited storage life. The present invention allows ambient distribution and storage temperatures prior to use.

SUMMARY OF THE INVENTION

It has now been found that sulfur dioxide-containing gelatinized (or cooked) potato pieces can be stored for prolonged periods without being subjected to extensive dehydration or refrigeration. More specifically, the present invention involves the discovery that uniform dispersion of sulfur dioxide ($SO_2$) in a critically controlled concentration throughout such potato pieces results in a product which can be packaged and stored at room temperature without microbial growth and without adverse effects on appearance and taste. Ultimate consumer use involves either no preparation or merely heating and/or completion of cooking. The sulfur dioxide-containing potato pieces of this invention can be readily stored at ambient temperatures for periods in excess of 6 months.

It has been found that the present invention is useful even though the treated potato pieces have a high residual moisture content resulting in water activity far above about 0.85. This level of water activity has been thought to be the maximum at which microbial stability can be attained by conventional methods of suppression of water activity, such as is employed to preserve intermediate moisture food products, for example, moist pet foods. The water activity of the gelatinized treated pieces of this invention is 1.0. Thus the product is actually in equilibrium (at 100% relative humidity) with the surrounding environment.

Particularly advantageous results have been obtained where the ultimate concentration of sulfur dioxide in the treated product is at least about 200 parts per million (0.2%) with 500 to 700 parts per million being especially preferred. Although storage characteristics do not appear to be adversely affected by larger concentrations of sulfur dioxide, it has been found that where the ultimately dispersed sulfur dioxide level is greater than 700 parts per million (0.07%), undesirable flavor characteristics develop when the potato pieces are subsequently reheated by the consumer. The aforementioned concentrations of sulfur dioxide are intended to include both absorbed and free $SO_2$.

When the present invention is employed with an impervious container to exclude contaminating bacteria, it has been found that storage of the sulfur dioxide-containing potato pieces is further enhanced by packaging them in an inert environment, i.e., either in a substantially oxygen-free gas such as nitrogen, carbon dioxide — nitrogen mixtures, or in at least a partial vacuum. Special advantages have been obtained where absorption of the sulfur dioxide by the potato pieces is accomplished in a sealed container filled with a gaseous environment composed essentially of sulfur dioxide and nitrogen. The package is also preferably impermeable to moisture vapor and oxygen, thus maintaining both the desired moisture level and absence of oxygen.

In still another aspect, it has been found that rate of absorption of gaseous sulfur dioxide by the potato pieces is directly related to their temperature during treatment with sulfur dioxide. Thus the rate of absorption is sharply reduced when the potato pieces are subjected to a temperature reduction near freezing. As discussed in detail hereinafter, the resulting prolonged exposure of the outer surfaces of the individual pieces to gaseous sulfur dioxide environment maximizes inhibition of bacterial and microbial growth on the surface thereof. The more prolonged the contact with sulfur dioxide in the surrounding gaseous environment, the more complete is ultimate protection. This aspect appears to have the additional advantage of minimizing the concentration of gaseous sulfur dioxide necessary to accomplish microbial stability.

Following the prolonged storage at ambient temperatures, the treated pieces can be either used directly without further treatment or prepared for consumption by refrying in deep fat, pan frying for a brief period of time such as 3–5 minutes or heating in an oven at approximately 450° F. for up to about 15 minutes. Other methods of finishing the potato pieces of this invention subsequent to storage will be apparent to one skilled in this art.

Although it is not intended that the present invention be limited to any theoretical concept, it appears that substantially fully gelatinized potato pieces interact differently with sulfur dioxide ($SO_2$) than do either fresh potato pieces or those that have merely been water blanched. Raw potato pieces exposed to $SO_2$ gas have been found to immediately lose significant amounts of water, apparently as a result of the $SO_2$ and free water (in the potato cells) forming sulfurous acid which in turn destroys further cell walls. Such treated pieces are unacceptable in flavor and texture. Even where raw potato pieces are first blanched (partially gelatinized) in water at elevated temperatures and then exposed to $SO_2$, some water losses have been noted along with the formation of the aforementioned off flavor and leathery texture. Surprisingly, fully gelatinized potato pieces that have been exposed to at least the aforementioned critical minimum levels of $SO_2$ do not exhibit any discernible water loss, nor is microbial growth present even after extended periods of storage at room temperature.

In heating steps such as gelatinization (cooking), starch gelatinization ties up the natural water content of the potato. Sulfur dioxide is rapidly absorbed and tightly held by the gelatinized starch in contrast to the loose binding between sulfur dioxide and raw starch as shown by the fact that sulfur dioxide treated raw potato pieces can be purged of much of the sulfur dioxide content by vacuum treatment, whereas, the sulfur dioxide content of substantially fully gelatinized pieces is only slightly reduced by a vacuum treatment. As a result, $SO_2$ is highly satisfactory for the room temperature stabilization of gelatinized or cooked potato pieces while unsatisfactory for fresh or pre-blanched potato pieces.

The term "potato piece" is intended to include whole peeled or unpeeled potatoes, diced pieces, strips, slices, potato hollows and the like. The terms "gelatinized" or cooked are intended to mean potato pieces that have been subjected to sufficiently prolonged high temperatures (in water or oil) to produce substantially complete gelatinization. When the potato pieces are subjected to at least partial cooking such as in conventional-type vegetable oils at temperatures of at least about 200° F for at least one minute, they are described as being "parfried". It will be obvious to one skilled in this art that various combinations of cooking temperatures and time can be utilized. Temperatures have been varied from 200°–350° F and cooking time from 1–12 minutes with french fry-type strips. Longer frying time tends to decrease the moisture content of the pieces and increases oil content while shorter frying time has the converse effect. The term "blanching" is intended to mean incomplete gelatinization by treating in water at about 180° F for brief time periods.

The novel product of this invention can be formed by treatment with sulfur dioxide both in the gaseous form and as a sulfurous acid solution. In order to insure that the interior of parfried potato pieces will be completely protected from the growth of microorganisms, it is necessary not only to employ a sufficient amount of sulfur dioxide, but to allow it to be absorbed generally uniformly throughout the piece by contacting all surfaces of the potato piece with $SO_2$. When a solution is employed, the sulfur dioxide absorption is accomplished by dipping the gelatinized or cooked pieces into the solution for a brief time such as a few minutes.

Generally speaking, when sulfur dioxide is introduced as a gas, the process can involve either the addition of sulfur dioxide to the ultimate package or the pieces can be tumbled in an $SO_2$ environment (such as would be provided in an air-tight rotatable drum) for a time sufficient to enable the pieces to absorb the prerequisite amount of sulfur dioxide gas after which the pieces are transferred to a package which is swept free of oxygen by flushing with inert gas before sealing. Absorption of the quantities of sulfur dioxide set forth herein to produce prolonged product microbial stability at ambient temperature decreases the pH of the potato pieces from about 5.7–6.3 to about 5.1–5.3.

It has been found that in the parfrying embodiment of this invention, potatoes with sugars as high as 3% can be utilized without any sugar reduction treatment. In prior art, frozen parfried products with sugar levels of 2.0% or lower were required and these levels were attained by conditioning raw potatoes by high temperature storage or by leaching sugars from the pieces in water as by a blanching step. By including a similar blanching step in the process of this invention, potatoes with sugar contents as high as 5% can be preserved successfully by reducing their sugar level only to about 3.0%.

When the potato pieces are prepared by parfrying, the amount of oil retained by the parfried pieces can be varied widely, although generally the conventional level is from 5 to 15% by total weight. It will be apparent to one skilled in this art that the deep fat frying can be accomplished with any of the commercially available animal fats and vegetable oils that are used in such cooking procedures.

For the reason that sulfur dioxide has a bleaching effect on the deep fat fried potato pieces, it is most desirable to provide additional coloring for the pieces following parfrying through the application of a heated coloring oil such as Vegetone, a natural color extract. The most desirable coloring has been attained when a coloring pigment such as Vegetone Popcorn Color, available from Kalamazoo Spice Extraction Company, in an amount of 0.025–0.050% by weight was suspended in Task oil (a trade name of Hunt-Wesson for an animal-vegetable fat) and the oil suspension heated to approximately 100°–250° F.

DESCRIPTION OF THE PREFERRED EMBODIMENTS

The following examples are intended to be representative of the process and product of this invention. It will be apparent that the details of the examples are not to be regarded as limitations, as they may be varied, as will be understood by one skilled in this art. All testing was performed at room temperature (about 75° F) and a barometric pressure of about 672 mm mercury. To determine concentrations of $SO_2$ at standard conditions, the following volume amounts would have to be modified by a factor of about 0.813.

EXAMPLE IA

Fresh potatoes were washed, peeled, trimmed and cut into french fry strips approximately three-eighths inch by three-eighths inch in cross-section. The odd sized pieces were removed and the remaining properly sized strips washed to remove any free starch. The strips were blanched in 180° F water for five minutes and drained. The strips were then parfried by submerging in Task oil at 320° F for 4 minutes. The parfried pieces were dipped in 200° F Task oil containing 0.05% Vegetone, drained and cooled near freezing after which one pound portions were added to impermeable flexible bags. Air was removed from the bags by displacement (sweeping) with nitrogen gas after which the bags were heat sealed. 0.290 g. (1 Milliliters) of sulfur dioxide was injected into each bag which was then resealed.

The bags were stored at room temperature and examined periodically over a period of six months for microbial growth, appearance and aroma. Measurable sulfur dioxide concentration was found to be about 500 parts per million at time of packaging. The products were found to be stable in all instances. At periodic intervals, strips were removed from the bags and were oven heated at 450° F for 15 minutes. Large consumer panels judged them to be comparable to those made directly from fresh potatoes and markedly superior to those made from other commercially available potato products.

EXAMPLE IB

Applying a process similar to that of Example IA, the parfried potatoes were drained and cooled. No coloring dip was employed. After treatment and storage, following the procedure of Example IA, at periodic intervals, bags of the strips were refried in deep fat. As in the previous case, consumer panels judged the finished product excellent in quality.

EXAMPLE IC

Applying the process set forth in Example IA, the prepared strips were subjected to a 3-minute water blanch at 180° F and then air dried to 50–65% moisture content. The blanched predried pieces were then packaged, gas treated and stored as in Example IB. No parfrying was employed. Upon subsequent panel testing, the product was rated satisfactory. (When the air drying step was eliminated from the above procedure, the finished product produced was of leathery texture.)

EXAMPLE ID

Potato strips were prepared and parfried as set forth in Example IB. The parfried pieces were then gently tumbled in an atmosphere of sulfur dioxide gas until the $SO_2$ content of the strips was in the range of about 500 parts per million. The treated strips were introduced in one pound portions into the aforementioned gas-impermeable, heat-sealable bags and the air removed therefrom by sweeping the bags with nitrogen. The bags were then sealed and stored at room temperatures, i.e., approximately 65° F. As in the previous examples, the parfried product was found to be microbially stable after prolonged storage periods and exhibited excellent quantity when refried to the finished french fried product.

EXAMPLE IE

Potato strips parfried in accordance with Example IB were subjected to dipping in an aqueous solution containing approximately 2% sulfurous acid, for about 2 minutes. The strips were drained and packaged in an inert environment of nitrogen. After various lengths of storage, samples were finish fried and found to have an acceptable flavor.

EXAMPLE IIA

Whole, unpeeled potatoes were washed and scrubbed to remove dirt and loose corky material; then cooked in Task oil at 250° F for 40 minutes. The cooked potatoes were then cooled at room temperature, packaged in the impermeable flexible bags and flushed with $N_2$ gas and sealed. 105 ml $SO_2$ per pound of cooked potatoes was injected into the bags which were then resealed and stored at room temperature. 105 ml equals 0.244 grams.

EXAMPLE IIB

The procedure of Example IIA was repeated except the scrubbed potatoes were cooked by baking in hot air in an oven. They were then cooled, packaged and gas treated as before.

EXAMPLE IIC

Small peeled potatoes were cooked in oil at 250° F for 30 minutes. The cooked potatoes were cooled, packaged and handled in the same way as described in Example IIA.

EXAMPLE IID

The procedure of Example IIA was followed except the potatoes were cooked in atmospheric steam for 50 minutes.

EXAMPLE IIE

The procedure of Example IID was duplicated except small peeled potatoes were cooked in atmospheric steam for 35 minutes.

EXAMPLE IIF

Potatoes were peeled; diced into ½ inch cubes; washed with water, and then blanched in water at 180° F for 4 minutes. The blanched cubes were then fried in oil for 4 minutes at 250° F; cooled to room temperature; and packaged under $N_2$ in the impermeable flexible bags and sealed. 105 ml $SO_2$ per pound of parfried cubes was injected into the pack and sealed and stored as in previous samples. 105 ml equals 0.244 grams.

After prolonged storage, the products of Examples IIA through IIF were found to be microbially stable and of excellent quality. The product of Example IIF is ideally suited for use in potato salad for example, with no required treatment. The product of Example IIA needs only be heated for a baked potato. Other uses for these new convenience potato products will be obvious to one skilled in this art.

Although the above examples disclose processes which produce microbially stable products of excellent quality even after prolonged ambient temperature storage, exhaustive studies were conducted to determine the parameters affecting both microbial stability and quality.

The concentration of sulfur dioxide was found to be critical. When the treated products contained more than 700 parts per million $SO_2$, the flavor was objectionable. When 0.203 g. or less sulfur dioxide gas was added to one pound of cooled parfried french fry strips, mold growth often developed after about two weeks of storage at room temperature. When 0.244 g. or more sulfur dioxide was added to and absorbed by one pound of cooled prefried strips, stability was attained in all cases. However, when the cooled strips were inoculated with Aspergillus, Rhizopus, and Penicillium mold cells at the level of about 1000 cells per gram product, some mold development was encountered in the stored product. It was found that the use of 0.406g.$SO_2$ per pound of product resulted in microbial stability even in inoculated packs. Similar inoculation was done using strains of *Bacillus cereus*, *Staphylococcus aureus*, *Bacillus polymyxa*, *Clostridium perfringens*, *Salmonella typhymurium*, *Erivinia carotovora*, and coliform bacteria. In all cases, where bacterial inoculation was employed, stability was attained when as little as 0.290g.$SO_2$ per pound of product was added.

Although the foregoing invention has been described in some detail by way of illustration and example for purposes of clarity and understanding, it will be apparent to one skilled in the art that certain changes and modifications may be practiced within the spirit of the invention.

What is claimed is:
1. A novel article of manufacture, comprising:
   substantially fully gelatinized potato pieces having a water activity of above about 0.85 containing about 200 to 700 parts per million of absorbed sulfur dioxide gas;
   a sealed container enclosing said pieces, said container being substantially impermeable to microbes and oxygen; and
   a substantially oxygen-free environment occupying the space in said container surrounding said pieces.
2. An article of manufacture in accordance with claim 1 wherein the amount of absorbed sulfur dioxide is from about 500–700 parts per million.
3. The article of manufacture of claim 1 in which said substantially fully gelatinized potato pieces are parfried.
4. The novel article of manufacture in accordance with claim 1 in which said oxygen-free environment comprises a gas selected from the group consisting of nitrogen, carbon dioxide and mixtures thereof.
5. The novel article of manufacture in accordance with claim 1 in which said oxygen-free environment comprises at least a partial vacuum.
6. The novel article of manufacture in accordance with claim 1 in which said gelatinized potato pieces are selected from the group consisting of whole unpeeled potatoes, whole peeled potatoes, and potato pieces.

* * * * *